March 26, 1968     H. J. STRETTON     3,374,893
SEWAGE PURIFICATION PLANT
Filed May 23, 1967     2 Sheets-Sheet 1

3,374,893
SEWAGE PURIFICATION PLANT
Henry Jackson Stretton, Slough, England, assignor to G. D. Peters & Co. (Engineering) Limited, Slough, England, a British company
Filed May 23, 1967, Ser. No. 640,548
Claims priority, application Great Britain, Dec. 6, 1966, 54,607/66
4 Claims. (Cl. 210—195)

ABSTRACT OF THE DISCLOSURE

Means for transferring sewage at a substantially constant rate from one portion of an aerobic sewage treatment plant, e.g. the aeration tank, to another portion, e.g. the settlement hopper comprises an air lift pump feeding sewage from the first portion into a transfer box provided with a first weir leading back to the first portion and a lower, substantially shorter, second weir leading to the other portion, the second weir being formed in or attached to a float so as to respond to the level of sewage in the transfer box. The second weir may be a lip of a telescopically slidable upper end portion of an outlet pipe projecting into the transfer box. Flow to the second weir may be smoothed by a baffle dipping into the sewage in the transfer box. The bulk of the flow into the box returns over the first weir and the level in the box varies little, any variations being compensated by the float moving the second weir so that the height of said level above the second weir is substantially constant.

---

In the British patent specification No. 1765/65 of the present Applicant there is described a sewage treatment plant of the aerobic type wherein the means of transfer from the aeration to the settlement stage is other than by natural flow, and where the rate of this transfer is substantially constant, by the use of an air lift feeding a transfer box provided with a first weir over which the liquor can pass back to the aeration stage and a second weir, lower and substantially shorter, over which a nearly constant flow passes to the settlement stage.

The consistency of the rate of flow thus achieved, while substantially constant, does vary between certain limits because of the increase or decrease in depth of the liquid in the transfer box. This change in depth is caused by the degree of immersion of the air lift. When the air entry point of the air lift is below a considerable head of the liquor to be pumped, its output is higher than when this head is reduced. Since the return overflow weir of the transfer box is then required to discharge more or less liquor the depth of the nappe or stream at the lip of the weir varies. This causes a proportional change in the depth of liquor passing over the lip of the small weir which feeds the settlement hopper, giving rise to fluctuations in the rate of flow.

The object of this invention is to provide a more constant rate of transfer.

According to the present invention means are provided whereby the second weir adjusts itself to the level of liquor in the transfer box thereby maintaining a more constant rate of flow.

According to one aspect of the invention, the said weir is part of or is carried by a float responsive to the liquor level in the transfer box. Preferably a baffle is provided between the two weirs to smooth the flow to the small weir, the liquor being fed to a region between the first weir and the baffle.

Figure 1:
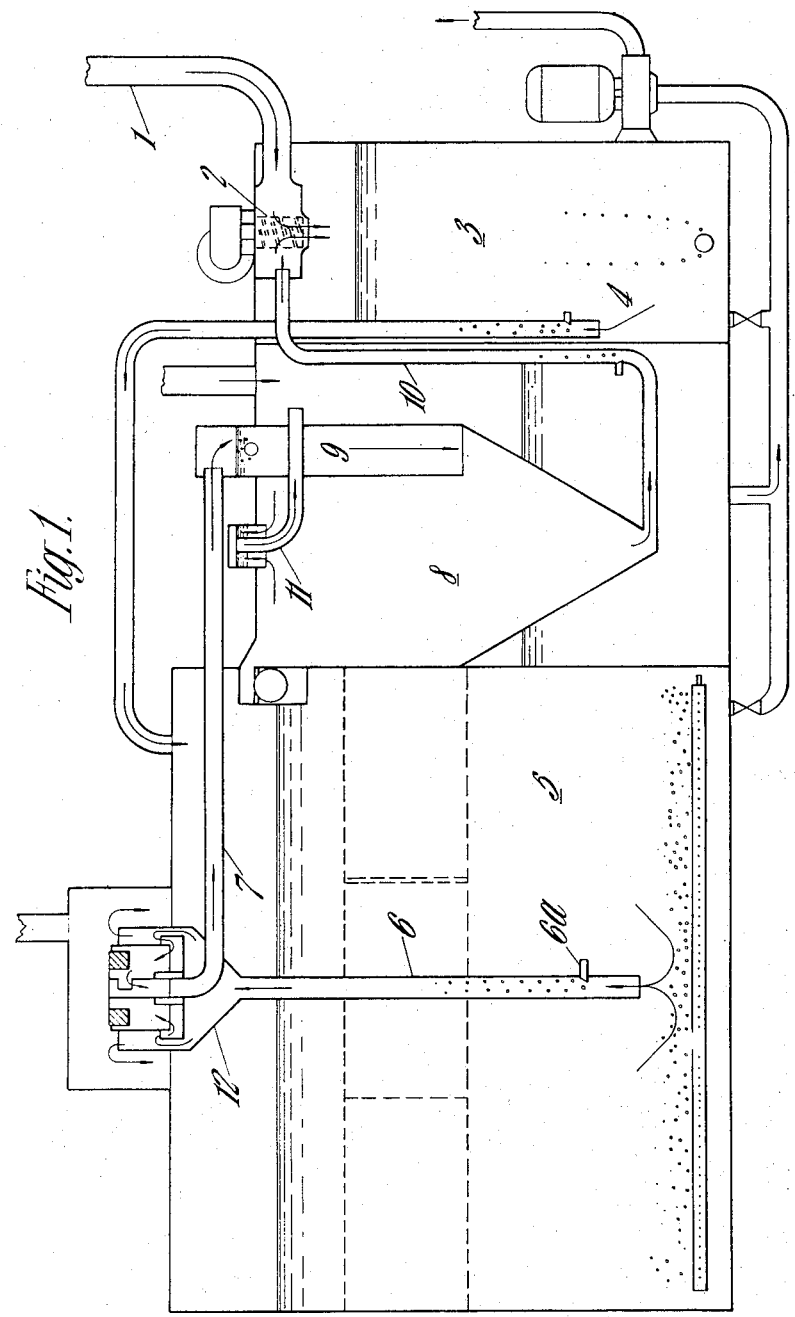

One convenient embodiment of the invention is shown in the accompanying diagrammatic drawings, in which:
FIGURE 1 shows an aerobic sewage plant; and
FIGURE 2 shows on a larger scale the transfer box used in the plant of FIGURE 1.

FIGURE 1 shows a typical flow diagram of an aerobic sewage treatment plant. Raw sewage enters the plant through the pipe 1 into the comminutor 2 which reduces the size of all solids contained within the sewage after which it falls into an aerated container 3. At intervals the partially reduced sewage is transferred by the air lift 4 into the main aeration tank 5. After a period of retention the mixed and aerated liquor is raised by means of the air lift 6 provided with an air inlet 6a when it passes through a flow-regulating transfer box 12. The regulated flow transferred from this passes along a pipe 7 into the settlement hopper 8 via the baffle portion 9. The process of settlement produces at the bottom of the hopper 8 a sludge which is fed through the air lift pipe 10 to the comminutor 2 wherein it mixes with the incoming raw sewage and initiates its biological degradation. A further result of the process of settlement is that a clear liquor relatively free from solid contamination and having a greatly reduced biological oxygen demand rises in the settlement hopper and passes the upturned edge of pipe 11. The liquor flowing through pipe 11 is known as the final effluent and it is disposed of in different ways according to the location of the plant.

Figure 2:
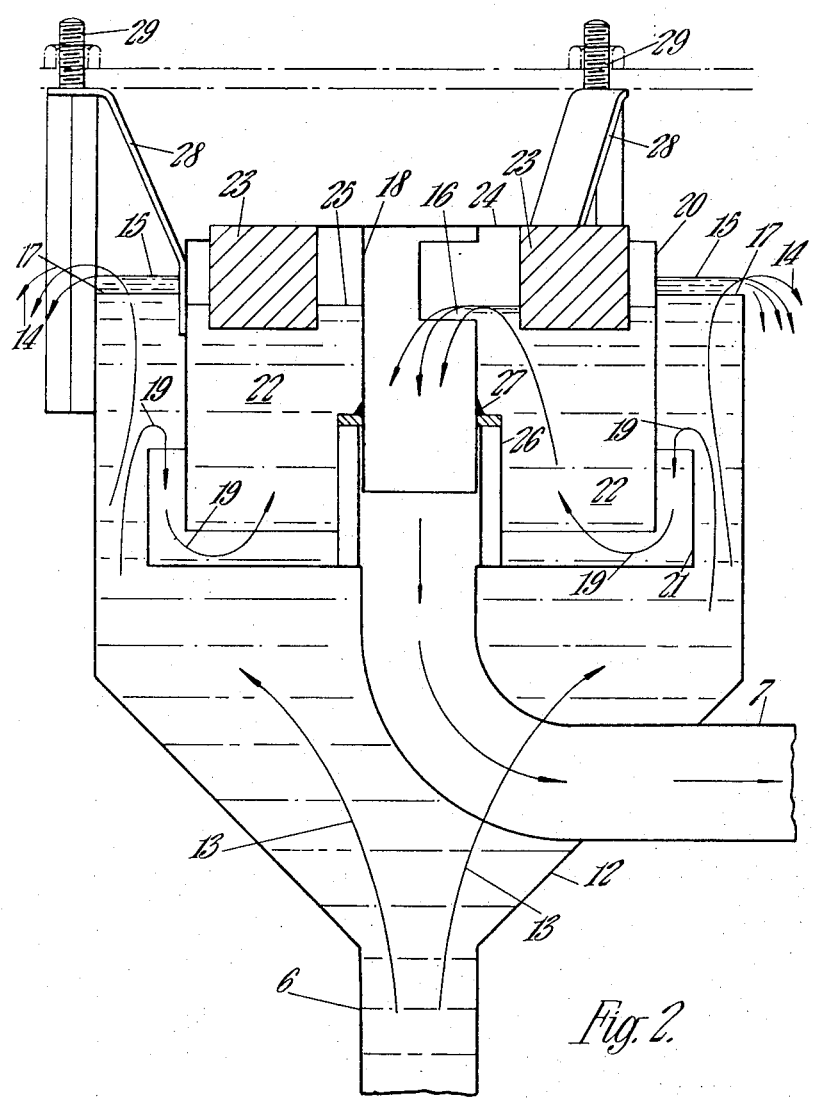

FIGURE 2 illustrates in greater detail the transfer box 12. The air lift numbered 6 on FIGURE 1 is shown up which liquor enters the circular conical bottomed box 12. The upward flowing liquor passes in the direction of the arrows 13 until the flow divides and the majority passes over the lip 17 of the transfer box 12 as illustrated by the arrow 14. At the same time air used to raise the liquor in the air lift 6 is able to escape from the free surface of the liquor at 15. The minor part of the flow passes down between fixed annular baffles 20, 21 arranged coaxially about the upper end of the outlet or transfer pipe 7, which projects into the transfer box. The lower outer baffle 21 is fixed to pipe 7 and the upper inner baffle 20 is fixed to suitable supporting means as described below. A telescopically slidable upper end portion 18 of pipe 7 constitutes a transfer tube and is cut away to form a horizontal lip or weir 16 with vertical ends. Because of the difference in levels between the lip 17 of the transfer box 12 and the lip 16 of the transfer tube 18 a difference of hydraulic head is created which causes a minor proportion of the total liquor passing through the device to divert down between fixed baffles 20 and 21 in the direction of the arrows 19. Because of the change downwards in the direction of flow of this liquor most of the residual air lift air continues along the easier upward route and escapes at the free surfaces 15. The liquor entering the space 22 within baffle 20 is relatively tranquil as it is protected from the turbulence caused by the air escaping from the surrounding annulus.

Floating in the liquor in the space 22 is an annular float 23 connected rigidly by the strap 24 to the transfer tube 18.

When there is a variation in the rate of discharge of the air lift pump 6 it will be seen that the flow over the lip 17 will also vary. The nappe or depth of liquor flowing over this lip will also vary proportionately thereby altering the height of the free surface 15. This in turn will alter the height of the surface 25. The float 23 will maintain its position relative to the surface 25 of the liquor in 22 and will therefore move upward or downwards according to the nature of the variation. Since the float is rigidly fixed to the tube 18 which is cut away to form the weir 16 it will be seen that the lip of this weir will always be maintained at a constant relationship with the surface 25.

The rate of flow of liquor over the weir 16 will not change even though the rate of flow of liquor entering the device through the air lift may vary between wide limits.

The transfer tube 18 is free to move vertically in a larger diameter tube 26 mounted on the deflector 21. To prevent the ingress of solids or the excessive flow of liquor into the clearance between these two tubes, a plastic seal 27 is screwed to the static tube 26.

The constant-flow transfer device shown in FIGURE 2 may be mounted any manner convenient to the general construction of the sewage treatment plant with which it is to be used. One convenient embodiment is illustrated in FIGURE 1 and 2 where the air lift 6 is integral with the device and the whole is mounted in the centre of the aeration compartment by means of the brackets 28 and the pillars 29. The device could be mounted outside the aeration compartment and the air lift connected to it by a horizontal or near horizontal pipe. The constant-flow transfer device could also be mounted at a different level relative to the highest or lowest level of the liquor surface in the main aeration compartment as shown in FIGURE 1.

It will be seen from FIGURE 2 that by raising or lowering the lip of the weir 16 relative to the float 23 the amount of flow passing into the transfer tube 18 can be set to give any required constant flow rate.

A constant-flow transfer device as described above can be used to feed sludge raised from the bottom of the settlement hopper 8 (FIGURE 1) at a measured rate into the comminuting device 2. If used in this manner is would be necessary to arrange that the returned excess flow would pass into the baffled part 9 of the setlement hopper so as not to cause undue disturbance and therefore prevent the process of settling.

I claim:

1. In an aerobic sewage treatment plant, sewage transfer means for transferring sewage at a substantially constant rate from a first section of the plant to a second section of the plant, said transfer means comprising an air lift pump, and a transfer box, the air lift pump being arranged for pumping sewage from said first section into said transfer box, said transfer box having a first weir arranged to pass return flow of sewage from said transfer box to said first section, and a lower and substantially shorter second weir arranged to pass a flow of sewage from said transfer box to said second section, said second weir being arranged for vertical movement with and responsive to the level of said sewage in said transfer box.

2. Sewage transfer means as claimed in claim 1 comprising float means responsive to said sewage level in said transfer box and operatively associated with said second weir.

3. Sewage transfer means as claimed in claim 2 comprising an outlet pipe for passage of sewage from said transfer box to said second section, said pipe having an upper end portion slidably mounted relative to the remainder of said pipe which end portion is provided with a lip constituting said second weir.

4. Sewage transfer means as claimed in claim 1 comprising a baffle arranged to dip into the sewage in the transfer box and disposed between said weirs, and means whereby the sewage entering said transfer box is directed to a region between said first weir and said baffle.

References Cited

UNITED STATES PATENTS

| 1,099,396 | 6/1914 | Rothwell | 210—197 X |
| 2,538,412 | 1/1951 | Cecil et al. | 210—221 |
| 2,638,444 | 5/1953 | Kappe | 210—220 X |

FOREIGN PATENTS 24,974  8/1919  Denmark.

REUBEN FRIEDMAN, *Primary Examiner.*

J. DE CESARE, *Assistant Examiner.*